March 9, 1954 K. VON EHRENKROOK 2,671,690
FORCED AIR SPRAYER AND DUSTER
Filed Feb. 21, 1948 4 Sheets-Sheet 2
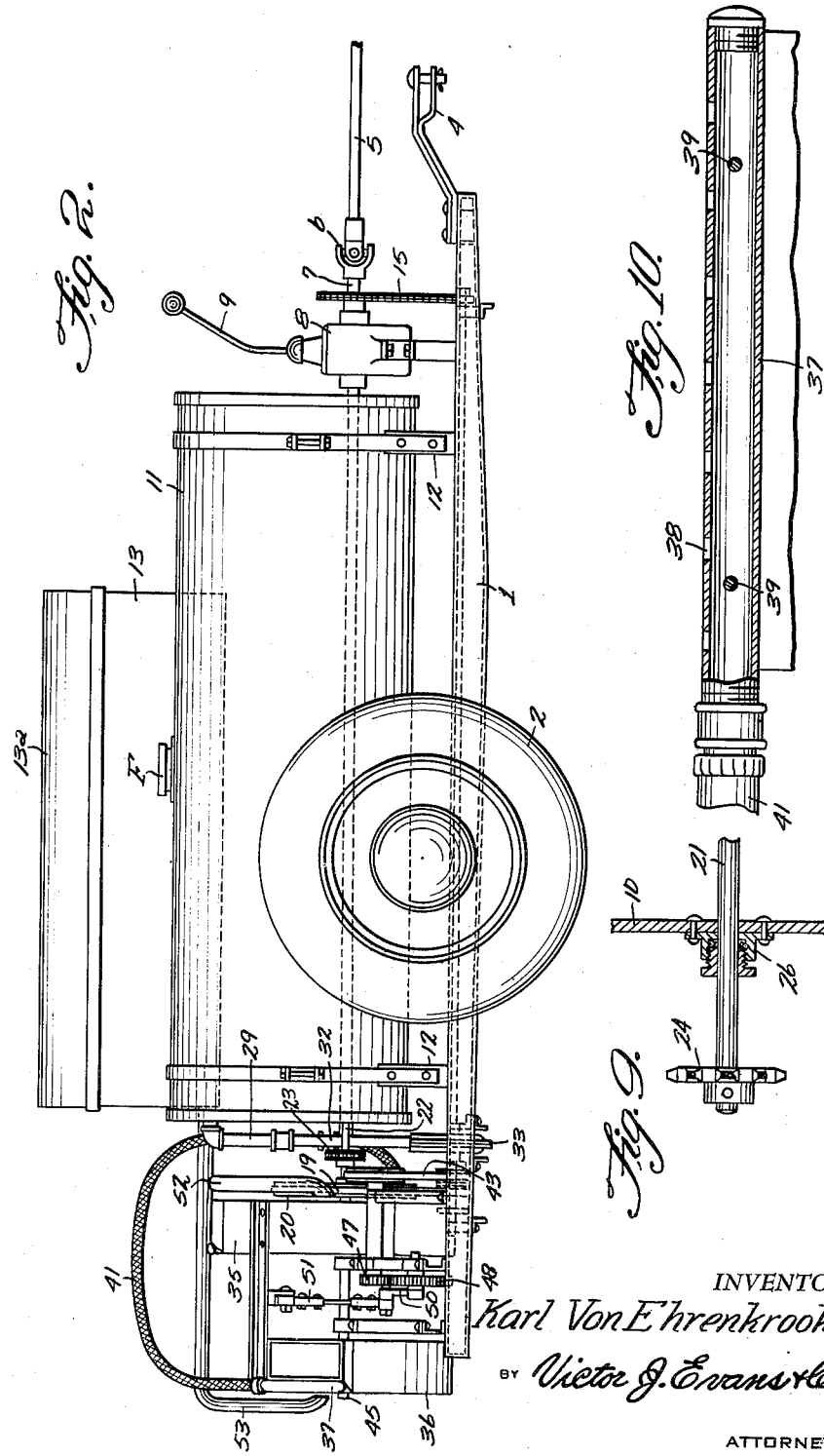
INVENTOR.
Karl Von Ehrenkrook,
BY Victor J. Evans & Co.
ATTORNEYS

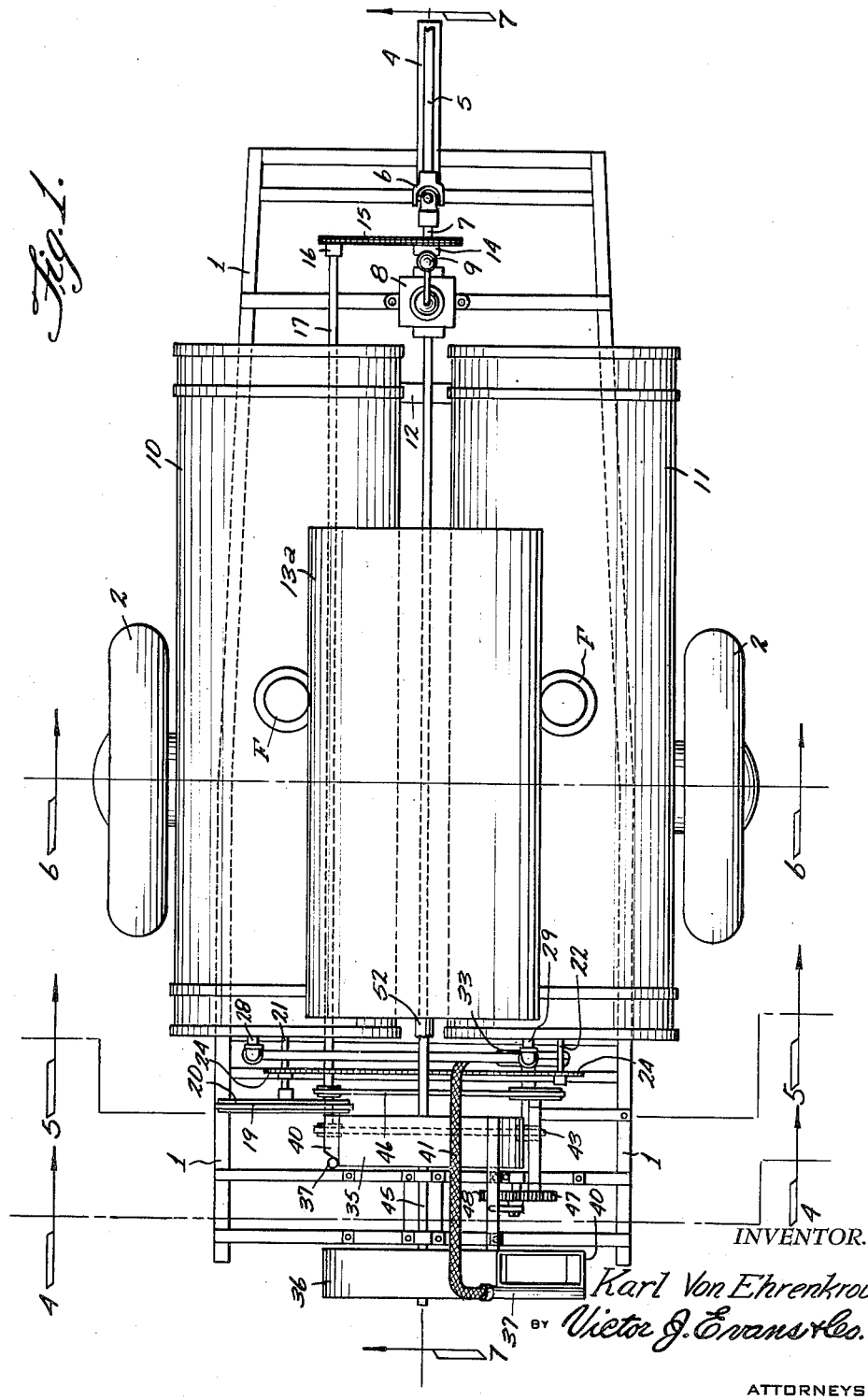

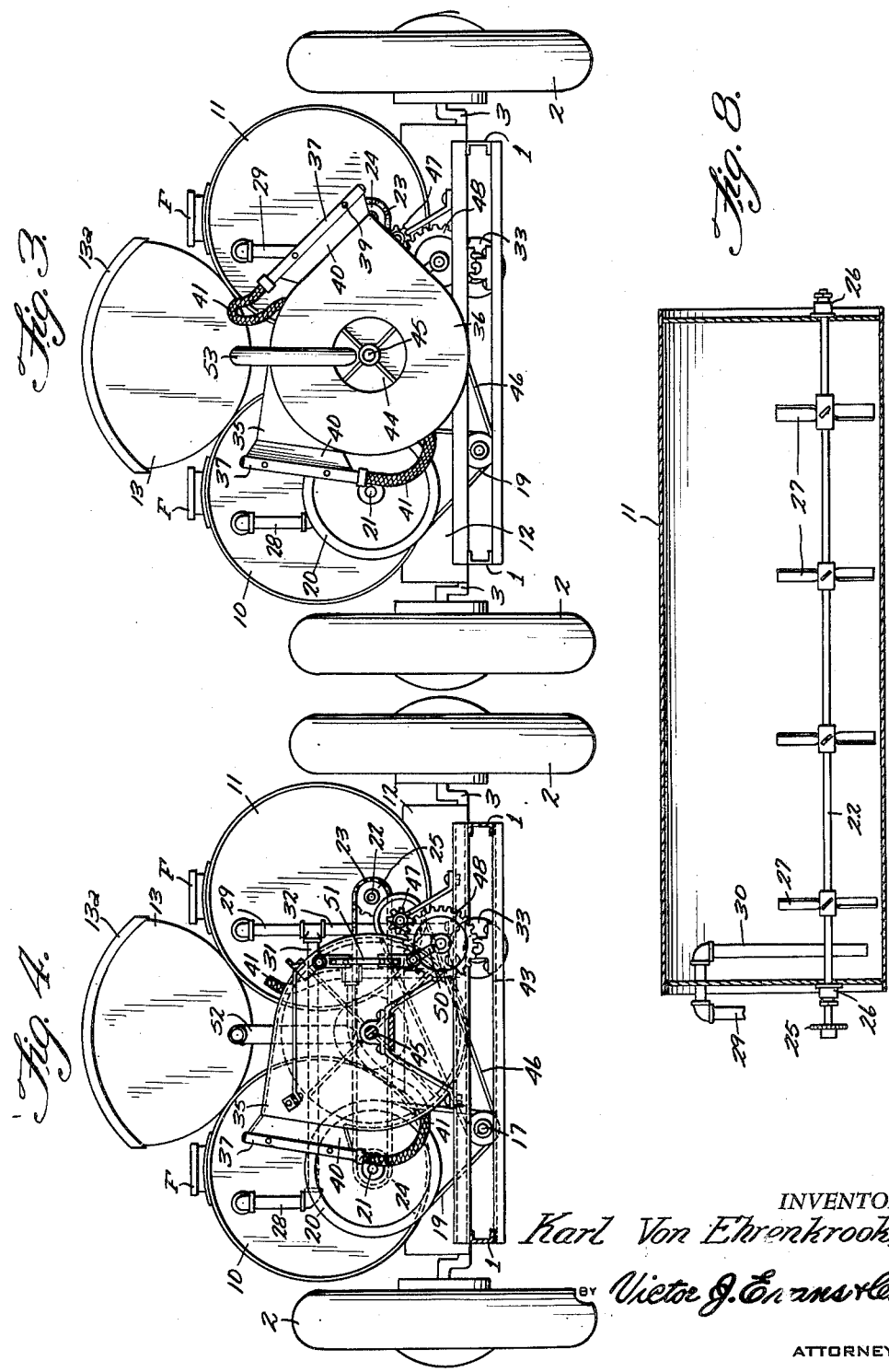

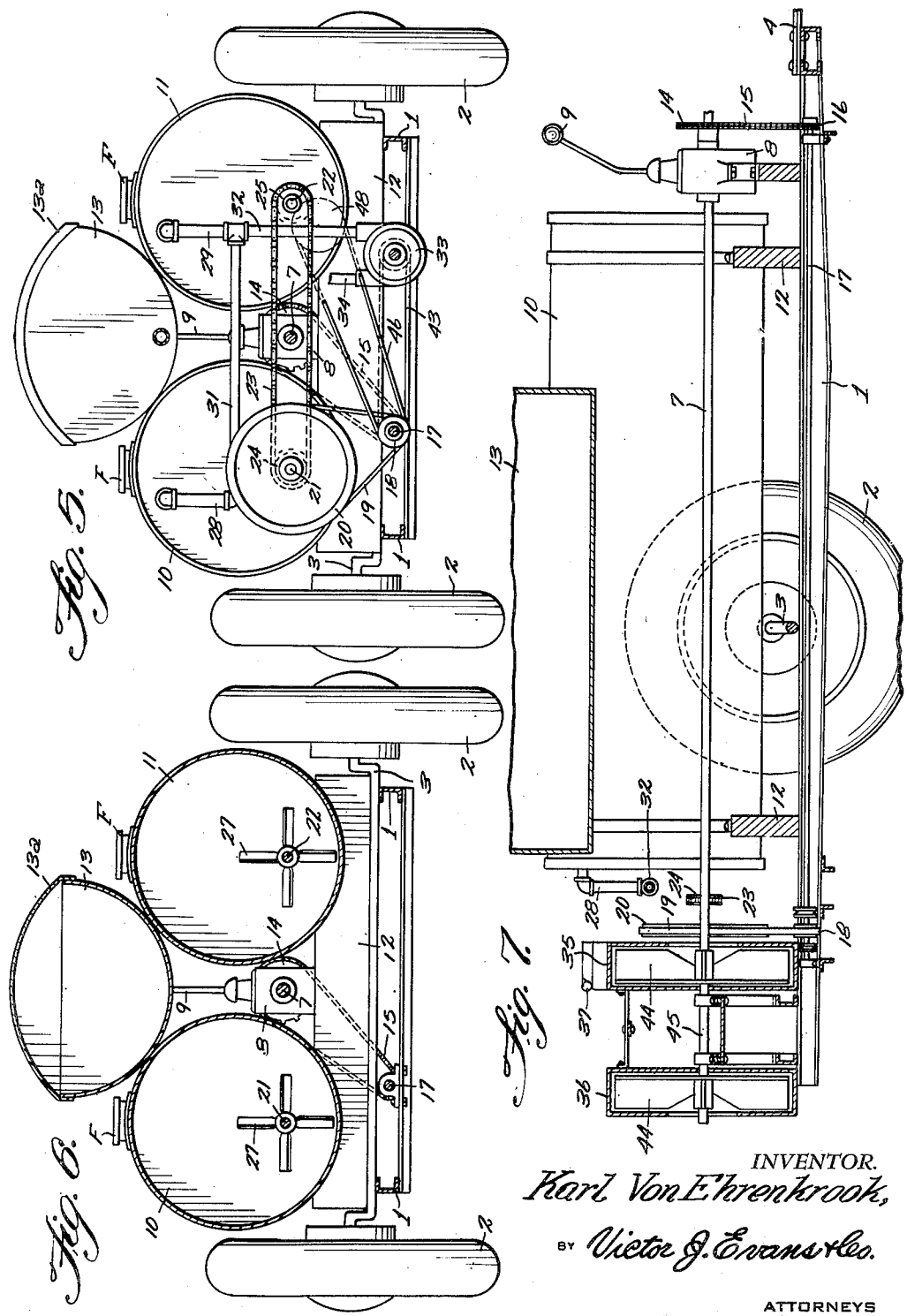

Patented Mar. 9, 1954

2,671,690

UNITED STATES PATENT OFFICE 2,671,690

FORCED AIR SPRAYER AND DUSTER

Karl Von Ehrenkrook, Palisade, Colo.

Application February 21, 1948, Serial No. 10,053

2 Claims. (Cl. 299—37)

My present invention relates to the general class of portable insect or vermin destroying implements of the powder-dusting, or spraying type, and utilizing rotary blowers, and more specifically, to an improved forced air sprayer and duster, preferably mounted upon a wheeled vehicle for towing by a tractor or other automotive vehicle. The primary object of the invention is the provision of a portable and power-operated implement, which, while adapted for various uses is especially designed for travel between two rows of trees in an orchard, and equipped with dual or twin spraying and/or dusting mechanisms, by means of which the adjoining sides of the two rows of trees may simultaneously be treated, to thoroughly, quickly, and efficiently permeate the foliage with clouds of spray or dust. The wheeled implement of my invention is preferably propelled or towed by a tractor, and power take-off mechanism from the tractor is employed for actuating and operating the dusting or spraying appliances of the implement which include two oppositely rotating blowers that have discharge openings that discharge and carry the atomized spray laterally in opposite directions, and these parts are combined and arranged to provide a "one-man" implement of minimum height for freedom in travel beneath the opposed rows of trees; and the appliances may be controlled and the implement maneuvered with facility in the performance of its functions.

The invention consists in certain novel features of construction and combinations and arrangements of parts, as will hereinafter be described, which may with facility be assembled in a unitary structure or implement, and these combinations of parts are more particularly set forth in the appended claims.

In the accompanying drawings I have illustrated a complete example of a physical embodiment of my invention in which the parts are combined and arranged in accord with one mode I have devised for the practical application of the principles of my invention; but it will be understood that changes and alterations are contemplated and may be made in these exemplifying drawings, within the scope of my claims, without departing from the principles of the invention.

Figure 1 is a plan view of a portable or wheeled implement in which my invention is physically embodied; and Figure 2 is a view in elevation at the right side of the vehicle or implement.

Figure 3 is a rear end view showing the relation of the dust hopper, liquid tanks, and opposed dual blowers, with operating parts omitted; and Figure 4 is a similar view with operating parts.

Figure 5 is a transverse vertical sectional view at the rear end of the implement, as at line 5—5 of Fig. 1.

Figure 6 is a transverse vertical sectional view as at line 6—6 of Fig. 1.

Figure 7 is a central vertical longitudinal sectional view at line 7—7 of Fig. 1.

Figure 8 is a central vertical longitudinal sectional view through one of the dual tanks of the implement showing the agitators therein.

Figure 9 is a detail view showing a bearing and mount for one of the sprocket shafts; and Figure 10 is an enlarged longitudinal sectional view through one of the spray nozzles of the dual blowers.

In order that the general arrangement and the utility of parts may readily be understood I have disclosed an implement having opposed dual blowers as previously described, which may be employed singly or jointly, for selective use, from which a liquid solution may be atomized and sprayed, air currents may be blown for quickly drying the trees after a shower, or powdered dust may be blown from the blowers when desired, all under manual control of an operator.

The wheeled implement in the nature of a trailer is provided with a usual chassis or main frame 1 and a pair of wheels 2, 2, journaled on the transverse axle 3, and a front coupling or hitch is indicated at 4 for towing connection with a tractor or other automotive vehicle adapted to pull and transport the implement.

A power output shaft, or take-off shaft 5, having a universal coupling 6, receives motion and power from the tractor and drives a central longitudinally extending power shaft 7 that is journaled in suitable bearings of the implement, and the power shaft is equipped with transmission gears, in the case 8, that are under manual control of a hand lever 9.

For the water, or liquid solution supply I utilize a pair of horizontally disposed, longitudinally extending, and parallel tanks 10 and 11, preferably of cylindrical shape, which are mounted upon a pair of longitudinally spaced transverse sills or bolsters 12, 12, and these tanks are provided with suitable filling means indicated at F.

A supply of powder or dust is carried in a centrally arranged and longitudinally extending hopper 13 having a removable lid as 13a, and the hopper is mounted on and above the two parallel tanks, to provide a minimum height for the implement that permits convenient maneuvering beneath the trees without contact with the foliage and fruit.

For thoroughly mixing the liquid solution in the tanks and maintaining the solids in suspension, each tank is provided with agitating means including operating means from the shaft 7 that is provided with a drive sprocket 14 at the front of the implement. A chain 15 passes around the drive sprocket to a driven sprocket 16 on the longitudinally extending shaft 17, journaled in bearings of the main frame and located below and at one side of the power shaft 7, and as best seen in Fig. 5 power is transmitted from shaft 17 to one of the tanks, as 10 through a chain drive including sprocket 18, chain 19, and a larger sprocket 20 on the agitator shaft 21.

Each tank is equipped with an agitator shaft, as 21 and 22, and the shafts are synchronized and operate in unison by means of a cross chain 23 passing around sprocket 24 on shaft 21 and a complementary sprocket 25 on shaft 22. As best seen in Fig. 8 the agitator shafts, which are journaled in sealed bearings 26 at the opposite ends of the tanks, are located in the lower portions of the tanks, and each shaft is equipped with a series of spaced rotary agitators 27 for mixing and maintaining the solution in liquid form for spraying and atomizing.

Each tank, at its rear end is provided with an outlet pipe, as 28 and 29, and the intake ends, 30, of these pipes terminate near the bottom of the respective tanks, the two outlet pipes being joined or united by a cross pipe 31. For conveying the liquid contents from the tanks a pipe 32 is connected with the outlet pipes, and this pipe 32 forms the intake for a rotary pump 33 mounted in the chassis below the tanks, and equipped with a discharge or outlet pipe 34, from which pipe the liquid to be atomized and sprayed is conveyed to the dual blowers 35 and 36.

In Figs. 3 and 10, each of the blowers is provided with an atomizing and spraying nozzle 37, having a closed end and a longitudinal series of spaced ports 38, and the nozzle is bolted or otherwise fastened at 39 to the oppositely facing discharge openings 40 for air of the respective blowers. These nozzles are connected by flexible pipes or hose 41 at 42 to the outlet pipe 34 from the pump, and the rotary pump is driven in suitable manner, as by a chain drive, or a belt drive 43 from the power shaft 17.

Each of the blowers 35 and 36 is equipped with a fan 44 and fan-shaft 45 for the two oppositely rotating fans, is journaled in bearings as a rear extension of the power shaft 7 for a direct drive for the center intake and peripheral outlet blowers, whereby the air currents from the blowers discharge and carry the atomized spray laterally in opposite directions.

Each blower or housing is rotatably adjustable or oscillatable on the power fan-shaft as an axis within a range of approximately thirty degrees, and the blowers are rocked in order that their sprays may be automatically raised and lowered in adapting the sprays to different heights of trees, and for this purpose the flexible pipes or hose attached to the nozzles permit the desired oscillating movement of the air discharge openings of the blowers. In Fig. 4 the blowers may be rocked on their common axis 45 by means of a chain drive 46 from the shaft 17 to a pinion 47 that meshes with a gear 48; and the gear wheel shaft is equipped with a crank arm or lever 50 that is connected by linkage 51 to the dual blowers.

Thus, as the implement advances between two rows of trees and the spraying operation proceeds, the two blowers are oscillated or rocked with a sweeping effect to spray the whole area of each row of trees from the lower trunk portions up to and including the foliage and tree tops; and the blowers may be manually controlled from the tractor.

In addition the implement may be equipped with auxiliary appliances, such as a light generating plant, operated from the power shaft for illumination at night; and a hose reel may be coupled to one of the tanks for spraying small trees.

For dusting purposes, the dust hopper 13 is provided with two ribbon conveyors 52 and 53 leading to the central intakes or air inlet ports of the twin fan blowers, which supply the dry dust to the fans, and from which the dust is blown or sprayed through the air discharge openings, in clouds as usual.

Having thus fully described my invention, what I claim as new and desire to secure by Letters Patent, is:

1. In a dual spraying implement of the wheeled-vehicle type having a longitudinally extending central power shaft and a pair of parallel horizontally disposed liquid tanks the improvement comprising a horizontally disposed power fan shaft having a fan thereon, a pair of dual air blowers mounted on said power fan shaft rearwardly of said tanks for oscillating movement in relation to each other, means for oscillating said blowers within a predetermined range to spray different heights of trees, a peripheral outlet on each air blower extending laterally of each blower in opposite directions from each other, a spraying nozzle in each outlet, power transmission means between the power shaft and the power fan shaft, a circulating pump having its intake in communication with said tanks, and means for supplying liquid from said pump to each of the spraying nozzles, the means for oscillating said blowers comprising a chain drive, linkage including pitmans connected to said blowers, and gear means driven by said chain drive and connected to said linkage.

2. In a dual spraying implement as in claim 1 wherein agitators are arranged in each tank, and means operated by said power shaft is provided for actuating the said agitators.

KARL VON EHRENKROOK.

References Cited in the file of this patent

UNITED STATES PATENTS

| Number | Name | Date |
| --- | --- | --- |
| 1,859,567 | Knapp et al. | May 24, 1932 |
| 1,864,198 | Johnson | June 21, 1932 |
| 2,220,082 | Daugherty | Nov. 5, 1940 |
| 2,253,802 | Ness et al. | Aug. 26, 1941 |
| 2,279,495 | Root | Apr. 14, 1942 |
| 2,297,110 | Parker | Sept. 29, 1942 |
| 2,331,107 | Daugherty | Oct. 5, 1943 |
| 2,374,955 | Raper | May 1, 1945 |
| 2,429,374 | Shade | Oct. 21, 1947 |
| 2,583,560 | Gaddis | Jan. 29, 1952 |
| 2,583,753 | Spreng et al. | Jan. 29, 1952 |